Dec. 25, 1956 H. H. MARTIN 2,775,195
METHOD OF DAMPENING A LITHOGRAPHIC PLATE
OR STONE AND A DAMPING ROLLER FOR USE IN
THAT CONNECTION
Filed May 15, 1953

2,775,195

METHOD OF DAMPENING A LITHOGRAPHIC PLATE OR STONE AND A DAMPING ROLLER FOR USE IN THAT CONNECTION

Hermann Heinrich Martin, Winterswijk, Netherlands

Application May 15, 1953, Serial No. 355,298

Claims priority, application Netherlands May 17, 1952

2 Claims. (Cl. 101—148)

In lithography or in general planographic or surface printing including offset processes, the image is transferred to the lithographic stone or plate with fat containing ink and after each print, the ink free areas of the stone or plate have to be damped with water, to render such areas ink repellent.

This damping is generally effected with the aid of a roller, surrounded by a cover of somewhat water repellent material, such as woolen felt or sometimes also unbleached cotton and over this a second cover or sleeve of a material which perfectly absorbs water.

Now it is known from the U. S. Patent 2,149,606 to use as such sleeve a seamless, knitted tube having rather long loops (such as plush made on a circular knitting machine), forming a pile or nap on the outer surface of the cover. This proposal has been made, on the one hand with the purpose of avoiding a longitudinal seam in the sleeve, as formerly was found in cases, where the second cover consisted of a piece of woven fabric sewed around the felt covered roller, and on the other hand to enhance the moisture absorbing capacity as well as to overcome various difficulties resulting from the use of flat knitted sleeves.

The present invention relates to a seamless, knitted sleeve for a damping roller of the kind disclosed in the above mentioned U. S. patent and is characterized by the fact that the free loops of the fabric after it has been knitted, are opened i. e. cut through or have their outer end portions cut off.

It has been found, that when using the known knitted sleeves, the loops of the water saturated fabric effect contact with the surface of the stone or plate at spaced apart locations while the areas of the stone or plate between such locations are not wetted to the same extent as the locations contacted by the loops whereby a completely uniform damping of the areas in question is not achieved.

On the contrary it has surprisingly appeared, that in the use of a sleeve in accordance with the present invention the small threads i. e. the remaining portions of the opened or cut off loops, in their wet condition and under the pressure caused by the rolling of the roller over the plate, tend to felt, producing thereby a uniform plane surface, which does not leave any impressions and notwithstanding has a high absorbtion capacity when dry, such capacity as experiments have shown being even higher than that of the known plush.

The opening of the loops can e. g. be effected by shaving the fabric, but it is preferred to cut the loops through successively, that is, during the knitting of the tube, so that all of the loops are cut.

In connection with the above, attention may further be called to the U. S. Patent 2,080,127 disclosing a seamless knitted cover for a damping roller having a napped surface. This, however, is much less satisfactory than the sleeve according to the present invention, because by napping a knitted surface only a very thin nap can be obtained, so that the coarse meshed texture of the knitting itself easily imprints itself, through the nap upon the stone or plate and causes uneven wetting and a corresponding undesirable pattern in the prints, particularly in the case of large, evenly tinted areas. This fault becomes even more serious as the thin nap wears off in use, which occurs after a relatively short time. Moreover the formation of the surface by napping a knitted fabric causes a considerable number of fibres to be drawn loose or substantially loose from the base, and such fibres will adhere to the stone or plate with very undesirable results.

The present invention provides a very dense and thick pile, which in wet condition is reasonably even and homogeneous. It wears very slowly and may be cleaned by brushing it, which a napped surface does not permit. It therefore has a much longer duration of life. Moreover there is no risk of fibres becoming loose and adhering to the stone.

The invention will hereinafter be further described with reference to the accompanying drawings, in which.

Figure 1:
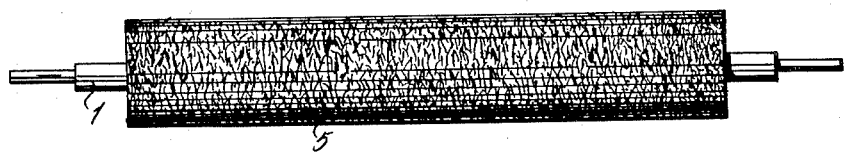
Figure 1 is an elevational view of a lithographing roll embodying my invention.
Figure 2:
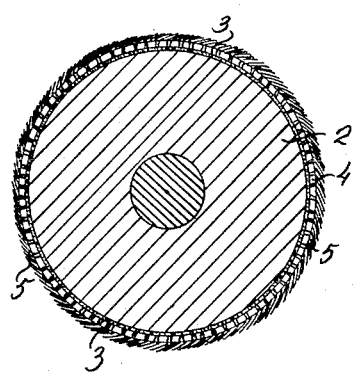
Figure 2 is a cross-sectional view of such roll on an enlarged scale.
Figure 3:
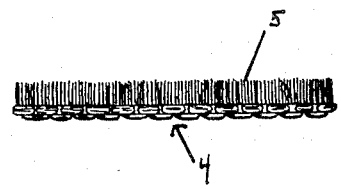
Figure 3 shows, on a still further enlarged scale, a fragmentary view of a section of the knitted sleeve shown in Figures 1 and 2.

Referring now specifically to the drawing, the usual lithographing roll is shown having a metallic shaft 1 extending therethrough and a cylindrical supporting body 2 of any suitable material as for instance rubber with a smooth outer surface and upon which a knitted pad or other cover 3 is placed.

Over this cover a sleeve 4 is drawn consisting of a knitted fabric, known per se, having freely projecting loops, which during the knitting of the sleeve are cut through to form relatively long free threads 5, constituting a rather high and dense pile. Alternately such threads may be formed by cutting off the top of said freely projecting loops such as by shaving the fabric after the sleeve has been knitted.

When saturated with water and under the pressure executed when the roll is moved over the lithographic stone or plate, such threads will somewhat felt producing thereby a substantially uniform plane surface which does not leave any impressions on the ink-free areas of the stone or plate.

It will be understood, that the use of the novel sleeve is not restricted to damping rollers for lithographic purposes, since it is of equal advantage in all cases, where through the medium of a covered roller having a water absorbing outer sleeve, any arbitrary surface may be wetted with a uniform closed liquid film.

What I claim is:

1. A damping roller, particularly useful for wetting the ink free areas of a lithographic plate, said roller comprising a cylindrical core rotatable about its longitudinal axis and having a tubular pad of water repellent material extending around said core, and an outer seamless, water absorbing cover extending around said pad, said cover consisting of a tubular knitted cut velour fabric having a dense and deep pile of single threads with free ends providing a felted, homogeneous working surface that is adapted to uniformly dampen a lithographic plate.

2. A method of dampening the ink free areas of a lithographic plate comprising the steps of wetting a damping roller having an outer seamless, water absorbing cover that consists of a tubular knitted cut velour fabric having a dense and deep pile of single threads with free ends providing a felted, homogeneous working surface, and rolling the damping roller across the lithographic plate so that water is uniformly transferred from the homogeneous working surface of the roller to the ink free areas of the plate.

References Cited in the file of this patent

UNITED STATES PATENTS

| | | |
|---|---|---|
| 1,287,121 | Skau | Dec. 10, 1918 |
| 1,833,315 | Burhans | Nov. 24, 1931 |
| 1,994,482 | Moore | Mar. 19, 1935 |
| 2,117,593 | Backofen | May 17, 1938 |
| 2,203,948 | Dupuis | June 11, 1940 |
| 2,345,337 | Gardner | Mar. 28, 1944 |